United States Patent Office 3,058,360
Patented Oct. 16, 1962

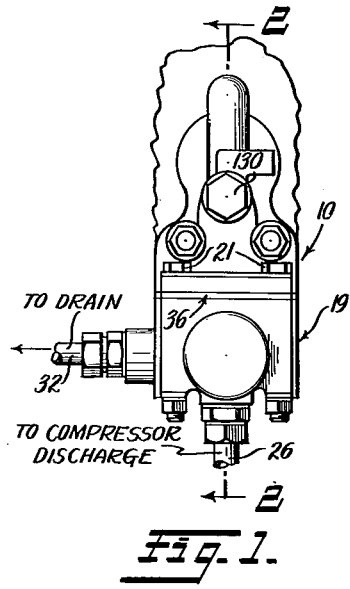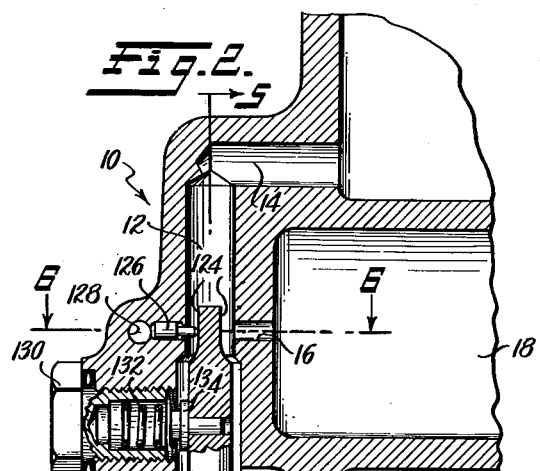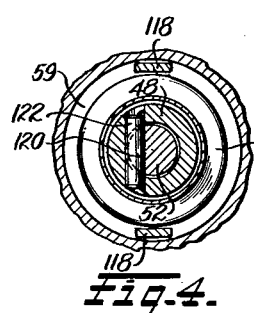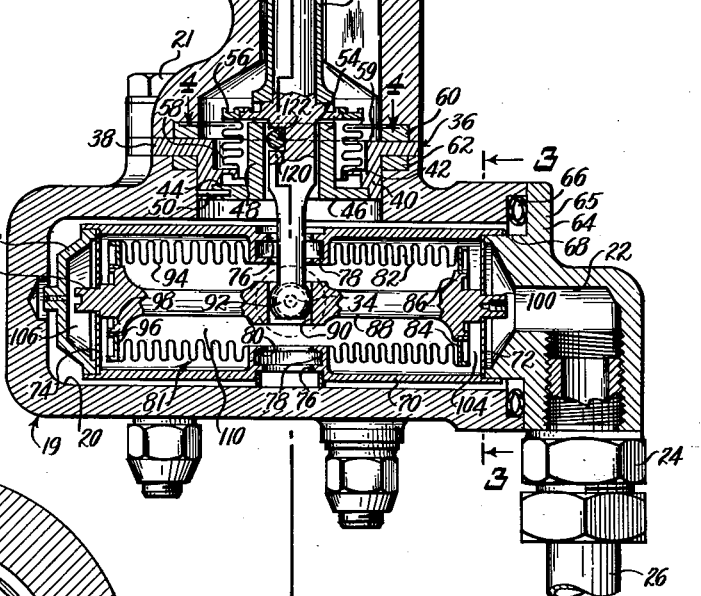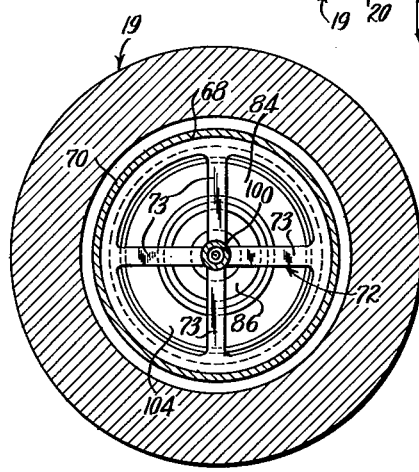

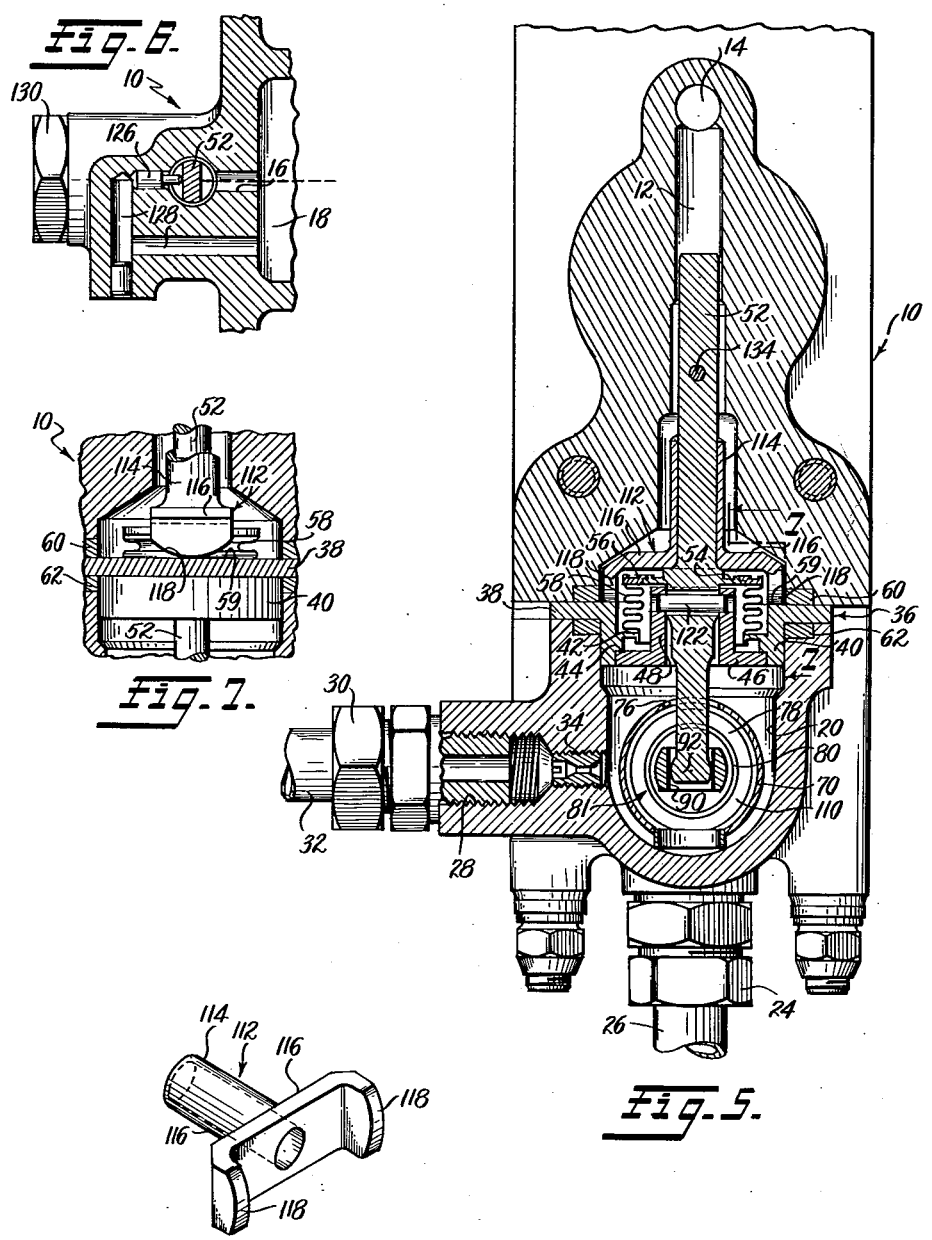

3,058,360
FRICTION FREE TRANSMISSION
James W. Collins, Berlin, Conn., assignor to United Aircraft Corporation, East Hartford, Conn., a corporation of Delaware
Filed Feb. 2, 1961, Ser. No. 86,821
8 Claims. (Cl. 74—18.1)

This invention relates to a pressure sensing device, and more specifically to a novel friction free transmission to transmit axial movement of a bellows to an axial movement of a control or other operated member.

While not limited thereto, this invention is disclosed in connection with a pressure sensing device for the control of the fuel supply to an afterburner of a turbojet engine, in which means, responsive to the compressor discharge pressure, controls the fuel supply to the afterburner through a mechanical linkage. In devices of this type, it is frequently necessary to transmit movement by way of linkages passing through pressure chambers. This raises problems of sealing about the movable parts while permitting movement without undue friction.

It is an object of the invention, therefore, to provide a novel linkage between a pressure responsive member and a control member which is practically friction free in operation.

It is a further object to provide a novel linkage of the type referred to having parts passing through a pressure chamber including novel fluid sealing means to prevent leakage.

It is a still further object to provide a novel linkage of the type referred to, in combination with a pressure responsive actuator, in which leakage from the pressure chamber will escape to ambient atmosphere or to a dump in a manner to permit uninterrupted operation of the control.

It is a still further object to provide a novel linkage of the type referred to having separate means to counteract axial thrust and transverse thrust.

With the foregoing and other objects in view which will appear in the following description, the invention resides in the novel combinaton and arrangement of parts and/or the details of construction hereinafter described and claimed, and illustrated in the accompanying drawings, in which:

FIG. 1 is an elevation view of a part of a control system embodying the invention;

FIG. 2 is a longitudinal sectional view, to a larger scale, taken on the line 2—2 of FIG. 1;

FIG. 3 is a sectional view, drawn to a larger scale, taken on the line 3—3 of FIG. 2;

FIG. 4 is a sectional view taken on the line 4—4 of FIG. 2;

FIG. 5 is a longitudinal sectional view, taken on the line 5—5 of FIG. 2;

FIG. 6 is a transverse sectional view of a detail, taken on the line 6—6 of FIG. 2;

FIG. 7 is a transverse sectional view of another detail, taken on the line 7—7 of FIG. 5; and FIG. 8 is a perspective view of the axial thrust member.

Referring to FIGS. 2 and 5, the reference numeral 10 designates a first housing defining a pressure chamber 12 having an outlet 14 and an inlet 16. The pressure chamber may be a part of a feeding system for supplying fuel to the afterburner of a turbojet engine, for example, in which case the inlet 16 is connected with a supply chamber 18.

A second housing 19, joined with the lower part of housing 10, defines a second chamber 20, constituting an actuator chamber, having an inlet 22 provided with a fitting 24 adapted to connect with a conduit 26 supplying a source of controlling pressure, as, for example, the discharge pressure of a compressor, to the interior of the chamber 20. The chamber 20 also includes an outlet 28 receiving a fitting 30 and a conduit 32 connected with a dump or with the ambient atmosphere. A choke 34 within the outlet 28 restricts the flow of fluid between the chamber 20 and the conduit 32.

A partition 36 separates the chambers 12 and 20, comprising a bearing ring 38 joining the lower end of the housing 10 with the upper end of the housing 19, and being held in assembled relation by a series of screws 21. The bearing ring 38 includes an axial cylindrical extension 40 fitting within a bore in the upper end of the housing 19, and includes an inwardly directed flange 42 for engagement with one end of a sealing member as will be described more fully hereinafter. The lower end of the extension 40 is rabbeted at 44 to receive, by a press fit, the flange 46 on one end of a sleeve 48, the parts being held in assembled relation by a radial pin 50 passing through the lower end of the axial extension 40 and the flange 46. The sleeve 48 has a lesser external diameter than the internal diameter of the axial extension 40, to define a sealing member receiving chamber, and has a slightly longer axial length as seen in FIGS. 2 and 5.

A lever 52 is axially disposed within the chamber 12, its lower end passing through the partition 36 and into the actuator chamber 20. Intermediate its ends the lever 52 carries a flange 54 to which is attached, as by brazing, soldering or welding, a collar 56 supporting the upper end of a sealing member 58, the lower end being soldered or brazed to the internal flange 42 of the extension 40. It will be noted that the cross section of the lever 52 in the vicinity of the partition 36 is circular, having a lesser diameter than the internal diameter of the sleeve 48, providing a working clearance to permit angular movement of the lever about its pivotal supports. It will also be noted that there is a slight working clearance between the upper end of the sleeve 48 and the lower surface of the flange 54, whereby the lever 52 is free to oscillate within a small arc without striking any part of the partition.

The bearing ring 38 includes a plane upper surface 59 within the lower end of the chamber 12 for a purpose to be set forth hereinafter. An upper gasket 60 prevents leakage between the partition 36 and the housing 10, while a lower gasket 62 prevents leakage between the partition and the housing 19.

The housing 19 is generally cylindrical in form, one end having an integral closure, and the other end having a removable closure plate 64 with a flange 65 cooperable with an O-ring 66 disposed within a rabbet on the outer end of the housing 19 to prevent leakage of fluid. The closure plate 64 carries an axial extension 68 supporting an elongated sleeve 70, the sleeve fitting about the extension and being fastened thereto, as by brazing. The supporting end of the sleeve 70 includes a shoulder which engages the periphery of a finger spring 72, which, as shown in FIG. 3, includes a series of resilient radially inwardly directed fingers 73 to resiliently support one end of a movable member. The opposite end of the sleeve 70 also includes a similar shoulder to engage the periphery of a second finger spring 74 having resilient fingers to engage the other end of the movable member, as will be explained more fully later. The sleeve 70 is provided with a pair of aligned diametrical openings 76 and a pair of spaced, radially inwardly extending flanges 78, each flange carrying an axially directed end flange 80.

An actuator 81 comprises a first bellows 82 attached at one end to one of the flanges 80 and at its other end to a ring 84, the ring, in turn, being attached to a head 86 on one end of a movable member 88 having a transverse bore 90, intermediate its ends, to receive the ball end 92 of the lever 52, forming, in effect, a joint having a line contact to reduce friction to a minimum. A second bellows 94, forming a part of the actuator 81, is attached at one end to the other flange 80 and at its other end to a ring 96 which ring, in turn, is attached to a head 98 on the other end of the link or movable member 88. It should be understood that the connections between the bellows 82 and 94 and their associated members are formed by soldering or brazing. The opposite ends of the movable member 88 include a pair of axial extensions 100 and 102 passing through openings in the ends of the finger springs 72 and 74 and having shoulders engaging the ends of the fingers 73 whereby the movable member 88 is maintained in a centered position and whereby movement thereof, in an axial direction, is resisted by deflection of one or the other of the two finger springs 72 and 74.

The bellows 82, in cooperation with the right hand end of the sleeve 70, defines a pressure fluid chamber 104 to which fluid under pressure is supplied by the conduit 26. The bellows 94, in cooperation with the left hand end of the sleeve 70 and a closure plate 108, defines an evacuated chamber 106. The closure plate 108 includes a peripheral flange which is received within a rabbeted end of the sleeve 70 and against the peripheral portion of the finger spring 74 to retain the parts in assembled relation, being secured together by brazing or welding.

From the foregoing, it is apparent that the lower housing 19 includes a pressure fluid chamber 104 effective on one end of the bellows 82, an evacuated chamber 106 effective on one end of the bellows 94, while the space between the bellows, forming an intermediate chamber 110, is at atmospheric pressure. Since the areas of the bellows 82 and 94 are the same, and since atmospheric pressure in the chamber 110 produces the same effect on both bellows, it is evident that the controlling device, constituted by the bellows 82 and 94, is responsive to the absolute discharge pressure of the compressor. It is also evident that any leakage of fluid from the sealing member 58 will escape to atmosphere or to a dump by way of the intermediate chamber 110, choke 34 and conduit 32, and will not interfere with the operation of the bellows, which can continue to control the movement of the lever 52, unaffected by the leak. Even if the rate of leakage through the sealing member should exceed the flow rate through the choke 34, the control device can continue in operation, as the pressure build-up in the intermediate chamber 110 will have an equal pressure force on both bellows 82 and 94, and in opposite directions, which will cancel out one another.

A yoke 112 includes a central sleeve 114 surrounding and secured to the lever 52 for pivotally mounting the latter, and also includes a pair of oppositely disposed arms 116 having arcuate rocker surfaces 118 on the ends thereof. As shown in FIG. 5, the rocker surfaces 118 engage the bearing surface 59 on the upper end of the bearing ring 38, there being sufficient clearance provided between the yoke and the walls of the pressure chamber 12 to permit rocking motion of the lever and the yoke without binding or interference. Immediately below the flange 54 on the lever 52, the side wall of the lever is notched at 120 to provide a plane wall, parallel with the longitudinal axis of the lever, to form a rocker surface for a pin 122 fixedly carried by the sleeve 48. As seen in FIGS. 2 and 4, the pin 122 is disposed transversely of the longitudinal axis of the lever 52 and to one side thereof, extending through the notch 120 and having bearing with a wall thereof. As shown in FIG. 2, the longitudinal axis of the pin 122 lies in the plane of the bearing surface 59.

The upper end of the lever 52 is provided with a pair of parallel flat surfaces 124, one of which is adapted to engage an operated member schematically shown by a broken line, and which can operate a valve to control flow through the inlet 16, or can operate a servomotor (not shown) disposed in the chamber 18, or can operate any other device, the particular operated means forming no part of the invention.

A plunger 126 includes an extension on one end acting on one of the flat surfaces 124, and the other end is connected by means of a by-pass 128 (FIGS. 2 and 6) with the chamber 18, whereby a force, at least partially equalizing the force of the operated member, is effective on the upper end of the lever 52.

A plug 130 houses a spring 132 which applies a force against the upper end of the lever 52, through a guide member 134 engaging a transverse bore in the lever 52.

The operation is as follows: the operated member (not shown) applies a transverse force against the upper end of the lever 52, tending to rotate the lever counterclockwise. At the same time, the fluid pressure within the chamber 12 acts downwardly on the flange 54 and the collar 56 in an axial direction. The yoke 112 and the rockers 118 thereon, engaging the bearing surface 59, oppose this axial force while permitting a friction free rocking motion of the lever. At the same time, the pin 122, engaging the wall of the notch 120, opposes the transverse force produced by the operated member, and the transverse force in the pressure fluid chamber 104 tending to rotate the lever 52 in a clockwise direction, yet permitting rolling action between the surface of the pin 122 and the wall of the notch 120, producing a friction free fulcrum for the lever 52.

From the foregoing, it is evident that I have devised a novel seal arrangement and pivotally supporting means for a lever which permits relative friction free movement of the lever through a partition carrying the sealing member, and which, in the event of a leak, permits continued operation of the controlling means. The bearing surfaces include rockers, one rocker resisting axial forces with a minimum of friction, and the other rocker resisting transverse forces, also with a minimum of friction. The movement about the two rocker bearings, while not a true rotary movement, is very close to such a movement. Furthermore, as the angle of movement is extremely small, the difference between a true rotary movement is negligible for regulation purposes.

It will be understood that various changes may be made in the details of construction and in the arrangement of the parts in the system disclosed herein without departing from the principles of the invention and the scope of the annexed claims.

I claim:

1. A mechanical movement comprising: a housing; a partition dividing said housing into a pressure chamber and an actuator chamber; a lever, extending through said partition, having movable ends in said pressure chamber and in said actuator chamber; an actuator in said actuator chamber connected with one end of said lever; fluid sealing means, associated with said lever and with said partition, between said chambers; and means, associated with said lever and with said partition, pivotally supporting said lever for rocking movement, said means including a first rocker member receiving axial thrust on said lever, and a second rocker member receiving transverse thrust on said lever; said first and said second rocker members being disposed on opposite sides of said fluid sealing means.

2. A mechanical movement comprising: a housing; a partition dividing said housing into a pressure chamber and an actuator chamber; a lever, extending through said partition, having movable ends in said pressure chamber and in said actuator chamber; an actuator in said actuator chamber connected with one end of said lever; fluid sealing means, associated with said lever and with said partition, between said chambers; and means, associated with said lever and with said partition, pivotally supporting said lever for rocking movement, said means including a first rocker member receiving axial thrust on said lever, and a second rocker member receiving transverse thrust on said lever; said first rocker member comprising a yoke having a central portion attached to said lever, and having arcuate surfaces on its ends.

3. A mechanical movement as defined in claim 2, in which said partition includes a bearing ring, said arcuate surfaces on the ends of said yoke having rocking contact with a plane bearing surface on said bearing ring.

4. A mechanical movement as defined in claim 2, in which said partition includes a bearing ring and a sleeve, said arcuate surfaces on the ends of said yoke having rocking contact with a plane bearing surface on said ring, and in which said second rocker member comprises a fixed cylindrical pin carried by said sleeve.

5. A mechanical movement as defined in claim 2, in which said partition includes a bearing ring and a sleeve, said arcuate surfaces on the ends of said yoke having rocking contact with a bearing surface of said bearing ring, and in which said lever includes a notch having a wall parallel with the longitudinal axis thereof, said second rocker member comprising a fixed pin carried by said sleeve and engaging said wall of said notch.

6. A mechanical movement as defined in claim 5, in which the axis of the fixed pin lies in the plane of the bearing surface of said bearing ring.

7. A mechanical movement comprising: a housing; a partition dividing said housing into a pressure chamber and an actuator chamber; a lever, extending through said partition, having movable ends in said pressure chamber and in said actuator chamber; an actuator in said actuator chamber connected with one end of said lever; fluid sealing means, associated with said lever and with said partition, between said chambers; and means, associated with said lever and with said partition, pivotally supporting said lever for rocking movement, said means including a first rocker member receiving axial thrust on said lever, and a second rocker member receiving transverse thrust on said lever; said partition includes a sleeve, and in which said second rocker member comprises a fixed cylindrical pin, supported by said sleeve, a surface of said pin engaging a surface of said lever.

8. A mechanical movement as defined in claim 7, in which said lever includes a notch, and in which said pin engaging surface comprises a wall of said notch.

References Cited in the file of this patent

UNITED STATES PATENTS

| | | |
|---|---|---|
| 2,177,058 | De Giers | Oct. 24, 1939 |
| 2,929,252 | Eavers et al. | Mar. 22, 1960 |

OTHER REFERENCES

Spofford, Abstract of application Serial Number 224,593, published September 2, 1952, O.G. 295–296.